United States Patent

[11] 3,591,710

[72] Inventors Katsuhito Uetake; Seishiro Iwamura; Yoshihisa Nishitani, all of Otokuni-gun, Kyoto, Japan

[21] Appl. No. 791,479
[22] Filed Jan. 15, 1969
[45] Patented July 6, 1971
[73] Assignee Mitsubishi Denki Kabushiki Kaisha Tokyo, Japan
[32] Priority Jan. 23, 1968, Jan. 24, 1968, Jan. 26, 1968
[33] Japan
[31] 43/3867, 43/4135 and 43/4653

[54] FINE TUNING INDICATOR
4 Claims, 5 Drawing Figs.

[52] U.S. Cl. .......... 178/5.8, 178/6, 334/33
[51] Int. Cl. .......... H04n 5/50
[50] Field of Search .......... 178/5.8, 6, 5.6; 334/33

[56] References Cited

UNITED STATES PATENTS

| | | | |
|---|---|---|---|
| 2,904,630 | 9/1959 | Bruch et al. .......... | 178/5.8 |
| 2,943,145 | 6/1960 | Parker .......... | 178/5.8 A |

*Primary Examiner*—Robert L. Griffin
*Assistant Examiner*—Richard P. Lange
*Attorneys*—Robert E. Burns and Emmanuel J. Lobato

ABSTRACT: A sawtooth current for horizontal deflection flows through an exciting winding of a pulse transformer to form pulses across its output winding one for each line. A direct current having a maximum for correct tuning flows through a control transformer winding to displace the pulse with respect to the associated sawtooth current. Upon rotating a finely adjusting knob the pulses are applied to a picture tube to form a vertical line on its faceplate. The knob rotates to bring the line just above a mark disposed on or adjacent the faceplate indicating its position corresponding to correct tuning. Then the line disappears.

FINE TUNING INDICATOR

BACKGROUND OF THE INVENTION

This invention relates in general to a fine tuning indicator device for aiding in finely tuning television receivers and more particularly to such a device for the indication of response in television receivers for correct tuning on a faceplate of a picture tube involved.

Heretofore, in order to indicate that television receiver have been correctly tuned, there have been used visual indicators such as electron-ray tubes, tuning point indicating meters etc. As the television receivers are devices for originally displaying the visual information it is unreasonable to indicate the correct tuning thereof on such visual indicators additionally disposed in the receivers. If it is possible to indicate the response in television receivers for correct tuning on a faceplate or a phosphor screen picture tube involved the receivers can be inexpensively produced and easily adjusted to correct tuning without the necessity of incorporating the above mentioned visual indicator into the receiver.

Lately, there have been proposed various attempts to utilize the phosphor screen in picture tubes as means for indicating the response in television receivers for correct tuning. For example, one pulse voltage could be produced in each of the scan intervals to display a vertical line on the screen in picture tubes. To this end, a blanking pulse as produced in each of the retrace intervals of the horizontal or vertical deflection current has been applied to a suitable monostable multivibrator or a time delay element providing a long time delay to form one pulse in each of the scan intervals. This measure has been very expensive.

SUMMARY OF THE INVENTION

Accordingly it is an object of the invention to provide a new and improved fine tuning indicator device for use in a television receiver.

It is another object of the invention to provide a new and improved fine tuning indicator device utilizing a picture tube in a television receiver to visually indicate the response of the receiver for correct tuning.

It is still another object of the invention to provide a new and improved device for visually indicating the correct tuning of a television receiver, simple in construction and inexpensively manufactured while indicating a direction in which the particular adjustment be effected to correctly tune the receiver.

With the above-cited objects in view, the invention resides in a fine tuning indicator device for use in a television receiver to indicate the response of the receiver for correct tuning on a faceplate of a picture tube involved, characterized by a pulse generating transformer including a saturable magnetic core a first, a second and a third winding inductively disposed on the magnetic core, the first winding being connected to a source of sawtooth current provided by an output from a deflection circuit disposed in the television receiver, the second winding responding to a change in magnetic flux developed in the magnetic core due to the sawtooth current flowing from the source through the first winding to generate one pulse voltage in each of the scan intervals for the application to an input to the picture tube, and a source of direct current for providing a direct current having a magnitude varying in accordance with a deviation of the response of the receiver from the response thereof for correct tuning, the source of direct current being connected to the third winding to control a time point at which the pulse voltage is developed across the second winding of the pulse generating transformer.

In a preferred embodiment of the invention, the first winding of the pulse generating transformer may be connected to a horizontal deflection coil and the source of direct current may comprise a video amplifier tuned to be resonant at the intermediate video frequency and a detector for detecting the output from the tuned video amplifier whereby one pulse is developed across the second winding of the transformer in each of the horizontal scan intervals at a point thereof dependent upon a deviation of the response of the television receiver from the response thereof for correct tuning. There are provided means having applied thereto the pulses to modulate an electron beam in the picture tube to form a line-shaped pattern on the faceplate of the picture tube and an indication mark disposed on or around the faceplate whereby the alignment of the line-shaped pattern with the indication mark indicates the response of the television receiver for correct tuning.

BRIEF DESCRIPTION OF THE DRAWING

The invention will become more readily apparent from the following detailed description taken in conjunction with the accompanying drawing in which.

DESCRIPTION OF THE PREFERRED EMBODIMENT

Figure 1:
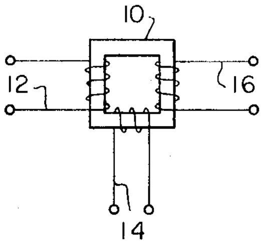
FIG. 1 is a diagrammatic view of a pulse transformer which is used with the invention.
Figure 2:
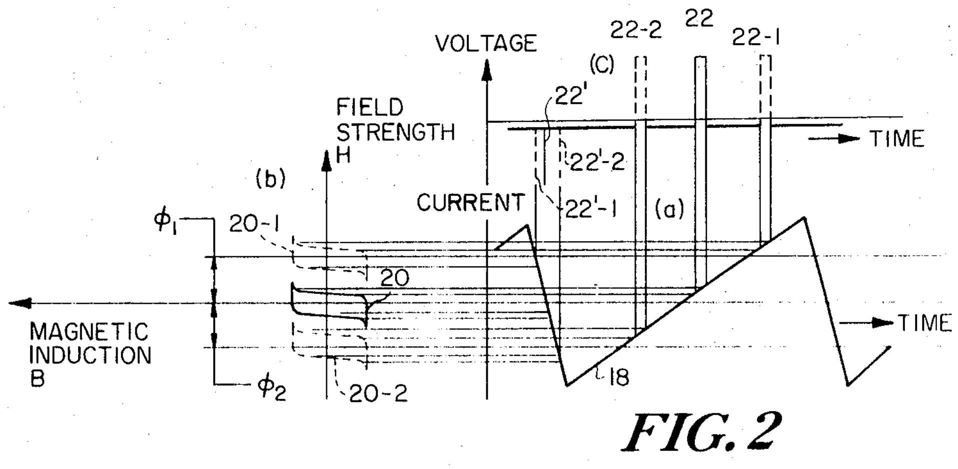
FIGS. 2*a*, *b* and *c* are curves useful in explaining the operation of the transformer shown in FIG. 1.

Referring now to the drawing and in particular to FIG. 1, there is illustrated a pulse generating transformer which is used with the invention. The transformer illustrated comprises a magnetic core 10 of any suitable ferromagnetic material having a low coercive force and a high permeability such as ferrite and three windings or an exciting winding 12, a control winding 14 and an output winding 16 inductively disposed on the magnetic core 10. The transformer is designed and constructed such that when the exciting winding 12 has flowing therethrough a sawtooth current such as shown at waveform 18 in FIG. **2*a* the ferromagnetic material for the core 10 can readily saturated to exhibit a magnetic saturation characteristic such as shown in FIG. 2*b*** wherein the vertical axis represents a magnetic field strength H and the horizontal axis represents a magnetic induction B.

With no direct current flowing through the control winding 14, the ferromagnetic responds to the sawtooth current flowing through the exciting winding 12 to describe a magnetic hysteresis loop as shown at solid line 20 in FIG. **2*b*. Since the magnetic induction or flux flowing through the core 10 material abruptly charges once for each of the ascending and descending portions of the sawtooth current the output winding 16 provides a positive rectangular pulse 22 and a negative rectangular pulse 22′ as shown in FIG. 2*c***.

On the other hand, if a magnitude of direct current flows in one or the other direction through the control winding 14 then a bias field or magnetomotive force $\Phi_1$ or $\Phi_2$ (see FIG. **2*b*) is developed in the ferromagnetic material for the core 10 in accordance with the polarity of the direct current. The bias field or magnetomotive force functions to displace the magnetic hysteresis loop from its position as shown at solid line 20 to its position as shown at dotted line 20–1 or 20–2 in accordance with the polarity and magnitude of the direct current flowing through the control winding 14. This displacement of the hysteresis loop is accompanied by the positive and negative pulses from the output transformer winding 16 similarly changing from their positions as illustrated at solid lines 22 and 22′ to their positions as illustrated at dotted lines 22–1 and 22′–1 or 22–2 and 22′–2 in FIG. 2*c*** respectively.

Therefore it will be appreciated that a flow of control direct current through the control winding 14 of the transformer causes the pulse voltage developed across the output transformer winding 16 due to a flow of sawtooth current through the exciting winding 12 to be displaced in its position relative to the associated sawtooth current. The invention utilizes the phenomenon just described.

Figure 3:
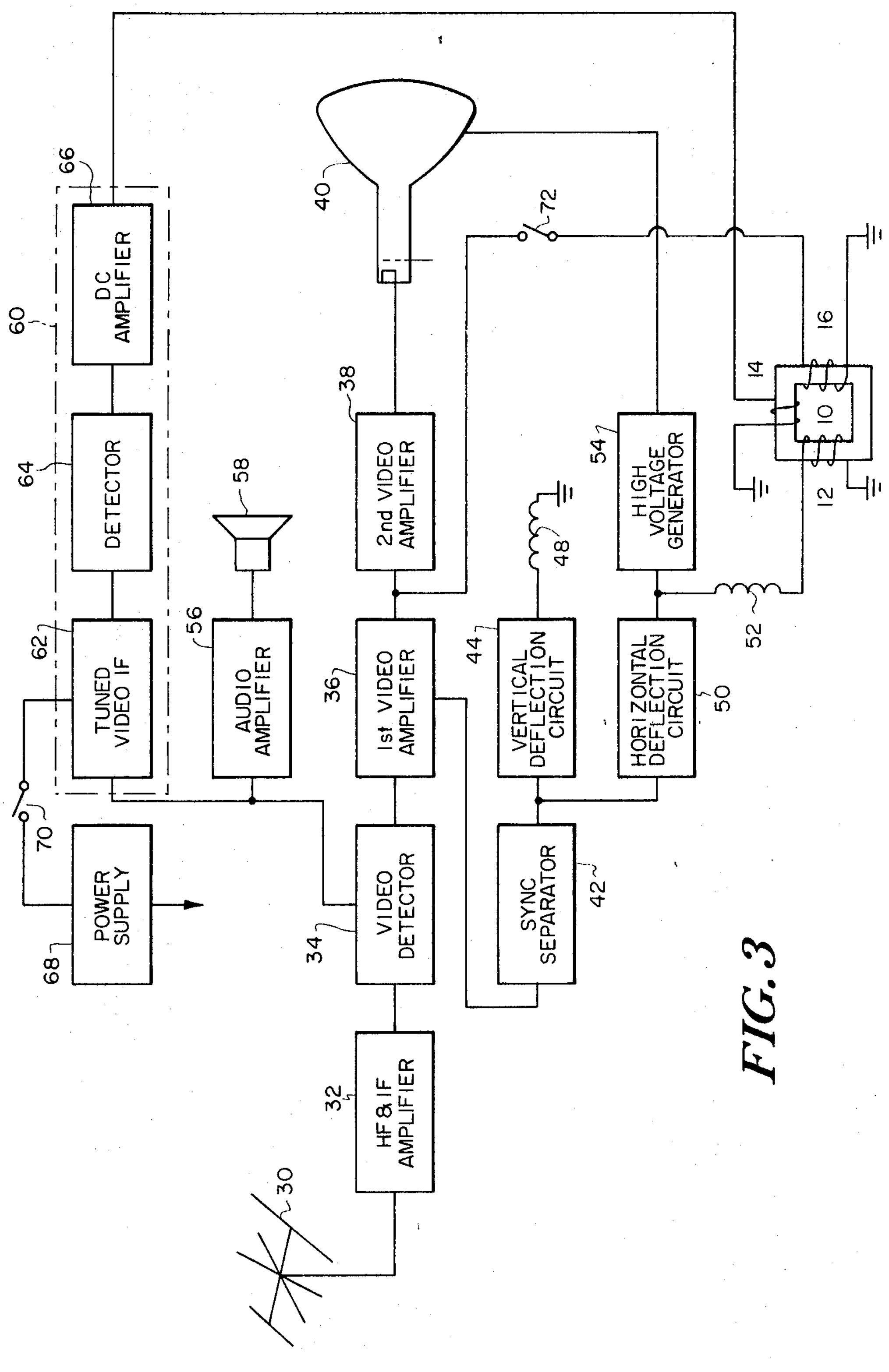
FIG. 3 is a block diagram of a television receiver embodying the invention.

Referring now to FIG. 3, there is illustrated a television receiver including a fine tuning indicator device constructed in accordance with the principles of the invention. The arrangement illustrated comprises a television antenna array 30, a high and intermediate frequency amplifier 32, a video detector 34, a first video amplifier 36, and a second video amplifier 38 serially connected in the named order. The output of the second video amplifier 38 is connected to a picture tube 40 in the conventional manner. The first video amplifier 36 is also connected to synchronization separator and amplifier circuitry 42 including an automatic gain control (AGC) not shown which is, in turn, connected to a vertical deflection circuit 44 and thence to a vertical deflection coil 48 connected to the ground. The circuit 42 is further connected to a horizontal deflection circuit 50 connected to both a horizontal deflection coil 52 and a high voltage generator 54 which is, in turn, connected to the picture tube 40 in the well-known manner.

The video detector 34 is also connected through an audio circuit 56 to a loudspeaker 58.

All the components as above described are of the conventional construction and need not be further described.

According to the principles of the invention the video detector 34 is connected to an indication current generator shown at dotted block 60 in FIG. 3 to generating a current indicating the response of the television receiver for correct tuning. The current generator 60 includes a video intermediate frequency amplifier 62 tuned to be resonant at the video intermediate frequency and connected to the video detector 34, a detector 64 connected to the tuned amplifier 62 to detect the output therefrom to provide a direct current, and a direct current amplifier 66.

Any suitable source 68 of electrical energy is adapted to supply an electrical energy to the current generator 60 through a switch 70. The output of the direct current amplifier 66 is connected to one end of a control winding 14 of a pulse generating transformer such as previously described in conjunction with FIG. 1. The junction of the first and second video amplifiers 36 and 38 respectively is connected through a switch 72 to one end of an output winding 16 of the transformer including an exciting winding 12 serially connected to the horizontal deflection coil 52. The three windings 12, 14 and 16 are connected at the other ends to the ground.

The switches 70 and 72 are normally open and may be preferably pushbutton switches. Both the switches are adapted to be closed manually or by a finely tuning knob (not shown) only during the finely tuning operation.

Figure 4:
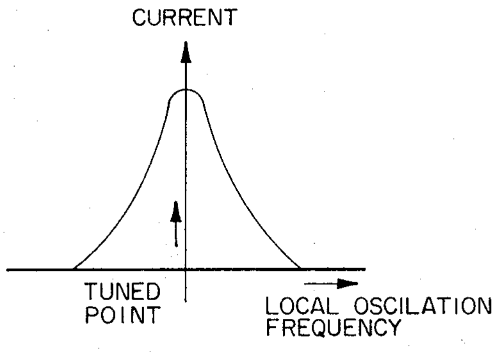
FIG. 4 is a waveform developed by the dotted block shown in FIG. 3.

Since the current generator 60 includes the amplifier 62 tuned to be resonant at the video intermediate frequency the output therefrom or from the amplifier 66 has a frequency response characteristic as shown in FIG. 4. That is, the direct current provided by the DC amplifier 66 has a maximum magnitude at the video intermediate frequency and decreases in magnitude as the response of the television receiver deviates from the resonance thereof for correct tuning. Assuming that the exciting transformer winding 12 is sufficiently less in impedance than the horizontal deflection coil 52, a current flowing through the exciting winding 12 will have a sawtooth waveform substantially identical to the waveform 18 as shown in FIG. 2*a*. In this case, the ascending portion of the sawtooth waveform 18 corresponds to one horizontal scan interval and the descending thereof corresponds to one retrace interval of horizontal deflection.

To finely tune the television receiver a finely tuning knob (not shown) involved is rotated with the switches 70 and 72 closed in the manner as previously described. This rotational movement of the knob causes a change in local oscillation frequency involved to provide an output current having a frequency response characteristic such as shown in FIG. 4 from the direct current amplifier 66. This current flows through the control winding 14 of the transformer including the exciting winding 12 having flowing therethrough a horizontal sweep current of sawtooth waveform leaving the horizontal deflection coil 52. Both the currents cooperate with each other to cause the output transformer winding 16 to provide pulses in the manner as already described in conjunction with FIGS. 2*a*, *b* and *c*. More specifically, the output winding 16 provides a pair of positive and negative pulses such as shown at 22 and 22', 22–1 and 22'–1 or 22–2 and 22'–2 in FIG. 2*c* in each of the horizontal scan intervals and in each of the horizontal retrace intervals respectively with a time point at which the pulse occurs in each of the scan retrace intervals being controlled by the magnitude of the direct current flowing through the control winding 14. These pulses are applied to an input to the second video amplifier 38 through the now closed switch 72. The negative pulses have no effect upon the system because they appear in the retrace intervals. The positive pulses applied to the second video amplifier 38 serves to modulate an electron beam generated in the picture tube 40 to display a vertical line in a raster on its faceplate 40*a* as shown at line 74, 76 or 78 in FIG. 5 as the case may be. With the video signal applied to the cathode of the picture tube, the positive pulses from the output transformer winding 16 may be inverted in polarity and applied to a grid of an amplifier tube in the second video amplifier 38 to develop a block vertical line in the raster on the faceplate of the picture tube.

Figure 5:
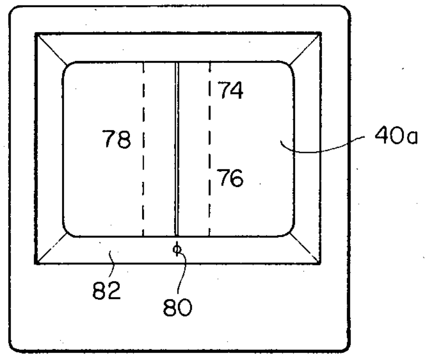
FIG. 5 is a schematic front elevational view of a television receiver illustrating the manner in which its response for correct tuning is indicated on a faceplate of a picture tube involved in accordance with the principles of the invention.

It is assumed that, with the television receiver correctly tuned, the video amplifier 38 has been adjusted to provide a maximum output while the vertical line developed in the raster on the faceplate 40*a* is in its position as shown at solid line 74 substantially lying on the vertical central line of the faceplate 40*a*. Then directly below the solid line 74 is disposed an indication mark 80 on an escutcheon 82 around the picture tube as shown in FIG. 5 or on the faceplate 40*a*. Thus it will be seen that if the television receiver is not tuned the particular vertical line developed on the faceplate 40*a* is a dotted line 76 or 78 not aligned with the mark 80. In order to correctly tune the television receiver, it is required only to rotate the associated knob in a direction that the line 76 or 78 is moved toward the mark 80 until it is aligned with the latter.

It is to be understood that instead of the horizontal deflection current a sawtooth wave provided by integrating the retrace pulses may flow through the control transformer winding 14 with the satisfactory results. Further the control direct current may flow through the control winding 14 in a direction that the field strength H or magnetomotive force is decreased.

It is to be understood that after the completion of the finely tuning operation, the current generator 60 is deenergized while at the same time the pulses from the output transformer winding 16 is presented from being applied to the second video amplifier 38 through the opening of the switches 70 and 72. At that time the vertical line 74 on the faceplate 40*a* disappears.

What we claim is:

1. A fine tuning indicator device for use in a television receiver to provide an indication on the viewing screen when correct tuning is achieved, comprising a pulse generating transformer having a saturable core and first, second and third windings inductively disposed on said core, means for connecting said first winding to a deflection circuit output signal in a television receiver, DC signal generator means having an input for connection to the video detector circuit of said receiver and having an output connected to said second transformer winding for applying a DC voltage to said second winding in proportion to the amplitude of the detected video signal, and means for coupling said third transformer winding to the video input of the cathode-ray tube of said receiver, whereby said indicator device produces an indicating line on said viewing screen, said line being movable upon fine tuning of said receiver.

2. A fine tuning indicator device as set forth in claim 1, further comprising marking means disposed on said receiver adjacent said viewing screen for indicating the position at which said indicating line should be disposed for optimum tuning.

3. A fine tuning indicator device as set forth in claim 1, further comprising a pair of electrical switches having common actuating means, one of said switches being coupled between said DC signal generator means and the power supply of said receiver, and the other said switch comprising said means for coupling said third transformer winding to the video input of the cathode-ray tube, whereby said switches are closeable to produce said indicating line on said viewing screen and openable to deenergize said indicator or device after fine tuning is achieved.

4. A fine tuning indicator device as set forth in claim 3, further comprising marking means disposed on said receiver adjacent said viewing screen for indicating the position at which said indicating line should be disposed for optimum tuning.